(12) United States Patent
Utagaki et al.

(10) Patent No.: US 7,758,694 B2
(45) Date of Patent: Jul. 20, 2010

(54) FIBER REINFORCED CEMENT COMPOSITION AND PRODUCTS AND MANUFACTURING PROCESS

(75) Inventors: Kazuo Utagaki, Nagoya (JP); Tadashi Sugita, Nagoya (JP); Satoshi Takayama, Nagoya (JP)

(73) Assignee: Nichiha Corporation, Nagoya-shi (JP)

( * ) Notice: Subject to any disclaimer, the term of this patent is extended or adjusted under 35 U.S.C. 154(b) by 1035 days.

(21) Appl. No.: 11/431,652

(22) Filed: May 11, 2006

(65) Prior Publication Data

US 2007/0261607 A1 Nov. 15, 2007

(51) Int. Cl.
  *C04B 7/02* (2006.01)
(52) U.S. Cl. .................. 106/713; 106/705; 106/716; 106/724; 106/731; 106/737; 106/789; 106/DIG. 1; 106/DIG. 2; 106/DIG. 3; 264/333
(58) Field of Classification Search .............. 106/713, 106/737, 705, 716, 724, 731, 789, DIG. 1, 106/DIG. 2, DIG. 3; 264/333
  See application file for complete search history.

(56) References Cited

U.S. PATENT DOCUMENTS

| 3,972,972 | A | | 8/1976 | Yano et al. | |
|---|---|---|---|---|---|
| 4,101,335 | A | * | 7/1978 | Barrable | 106/644 |
| 5,188,889 | A | | 2/1993 | Nagatomi et al. | |
| 5,858,083 | A | | 1/1999 | Stav et al. | |
| 5,945,044 | A | | 8/1999 | Kawai et al. | |
| 6,001,169 | A | | 12/1999 | Kawai | |
| 6,138,430 | A | * | 10/2000 | Van Acoleyen et al. | 52/745.19 |
| 6,506,248 | B1 | * | 1/2003 | Duselis et al. | 106/713 |
| 6,572,697 | B2 | * | 6/2003 | Gleeson et al. | 106/705 |
| 6,605,148 | B2 | | 8/2003 | Shirakawa et al. | |
| 6,676,745 | B2 | * | 1/2004 | Merkley et al. | 106/726 |

(Continued)

FOREIGN PATENT DOCUMENTS

JP 54-99131 A 8/1979

(Continued)

OTHER PUBLICATIONS

JP 7291707 A (Kubota KK Teramoto Hiroshi) Nov. 7, 1995 abstract. See IDS submitted by applicants for their related U.S. Appl. No. 11/410,311 Utagaki.*

(Continued)

*Primary Examiner*—Paul Marcantoni
(74) *Attorney, Agent, or Firm*—Birch, Stewart, Kolasch & Birch, LLP

(57) ABSTRACT

A fiber reinforced cement composition comprising the following raw materials: not less than 25% by mass and not more than 45% by mass of a hydraulic inorganic material; not less than 50% by mass and not more than 65% by mass of a siliceous material; not less than 5% by mass and not more than 12% by mass of woody reinforcement; not less than 0.25% by mass and not more than 1.5% by mass of a water soluble resin, wherein the hydraulic inorganic material is a Portland cement, the siliceous material is an amorphous material selected from the group consisting of fly ash, silica fume, blast furnace slag, perlite powder, glass powder, and mixtures thereof; the woody reinforcement is needle-leaves-tree unbleached kraft pulp and/or needle-leaves-tree bleached kraft pulp and used newspaper, and the water soluble resin is a polyvinyl alcohol resin.

25 Claims, 6 Drawing Sheets

U.S. PATENT DOCUMENTS

| | | | |
|---|---|---|---|
| 6,872,246 B2* | 3/2005 | Merkley et al. | 106/805 |
| 7,344,593 B2* | 3/2008 | Luo et al. | 106/726 |
| 2001/0047741 A1* | 12/2001 | Gleeson et al. | 106/709 |
| 2003/0205172 A1* | 11/2003 | Gleeson et al. | 106/679 |
| 2004/0168615 A1* | 9/2004 | Luo et al. | 106/805 |
| 2005/0235883 A1* | 10/2005 | Merkley et al. | 106/805 |
| 2006/0043627 A1 | 3/2006 | Sugita et al. | |
| 2008/0148999 A1* | 6/2008 | Luo et al. | 106/805 |
| 2008/0203365 A1* | 8/2008 | Gleeson et al. | 252/601 |

FOREIGN PATENT DOCUMENTS

| | | |
|---|---|---|
| JP | 58-110443 A | 7/1983 |
| JP | 61-256956 A | 11/1986 |
| JP | 1-242452 A | 9/1989 |
| JP | 1-320243 A | 12/1989 |
| JP | 3-97644 A | 4/1991 |
| JP | 3-257052 A | 11/1991 |
| JP | 04-042875 A | 2/1992 |
| JP | 04-114937 A | 4/1992 |
| JP | 4-160045 A | 6/1992 |
| JP | 4-187552 A | 7/1992 |
| JP | 04-193748 A | 7/1992 |
| JP | 04-295072 A | 10/1992 |
| JP | 4-305041 A | 10/1992 |
| JP | 5-124845 A | 5/1993 |
| JP | 05-229859 A | 9/1993 |
| JP | 6-32643 A | 2/1994 |
| JP | 6-56496 A | 3/1994 |
| JP | 6-321602 A | 11/1994 |
| JP | 6-329457 A | 11/1994 |
| JP | 7-117027 A | 5/1995 |
| JP | 07-291707 A | 11/1995 |
| JP | 7-291763 A | 11/1995 |
| JP | 08-040758 A | 2/1996 |
| JP | 9-87001 A | 3/1997 |
| JP | 10-231161 A | 9/1998 |
| JP | 11-322395 A | 11/1999 |
| JP | 2000-264701 A | 9/2000 |
| JP | 2001-158678 A | 6/2001 |
| JP | 2001-233653 A | 8/2001 |
| JP | 2001-287980 A | 10/2001 |
| JP | 2002-166406 A | 6/2002 |
| JP | 2003-146731 A | 5/2003 |
| JP | 2004-196601 A | 7/2004 |
| WO | 2006/025331 | 3/2006 |

OTHER PUBLICATIONS

JP 8040758 A (Asahi Glass Co-Yada Akira) Feb. 13, 1996 abstract. See IDS submitted by applicants in U.S. Appl. No. 11/410,311.*

JP 49045934 A (Kuraray) May 2, 1974 abstract. See this document submitted with applicants in U.S. Appl. No. 11/410,311.*

JP 49045935 A (Kuraray) abstract. See this document submitted with applicants in U.S. Appl. No. 11/410,311.*

A handout of the No. 9 Administrative level study meeting held by the Ministry of Health Labor and Welfare Labor Standard Bureau of Japan on Jul. 29, 2003, with a partial translation and a concise explanation of relevance (3 sheets.).

A report by Japan Society for Occupational Health; "Advices such as allowable concentration;"; *Sangyoeiseigaku Zasshi(Occupational Health Magazine)*; vol. 47, pp. 150, 157-158 (Apr. 20, 2005), with a partial translation and a concise explanation of relevance (1 sheet.).

Japanese Office Action issued on Jan. 12, 2010 in related JP Application No. 2004-251708.

Third-Party Submission document filed on Jan. 4, 2010 in related Japanese Patent Application No. 2004-251708.

Third-Party Submission document filed on Jan. 5, 2010 in related Japanese Patent Application No. 2004-251706.

Third-Party Submission document filed on Jan. 5, 2010 in related Japanese Patent Application No. 2004-251707.

Third-Party Submission Notice issued on Jan. 28, 2010 in related Japanese Patent Application No. 2004-251708.

Third-Party Submission Notice issued on Jan. 29, 2010 in related Japanese Patent Application No. 2004-251706.

Third Party Submission Notice issued on Jan. 29, 2010 in related Japanese Patent Application No. 2004-251707.

* cited by examiner

FIBER REINFORCED CEMENT COMPOSITION AND PRODUCTS AND MANUFACTURING PROCESS

CROSS-REFERENCE TO RELATED APPLICATION

PCT/JP2005/015667

U.S. patent application Ser. No. 11/215,964

BACKGROUND OF THE INVENTION

1. Field of the Invention

The present invention relates to a fiber reinforced cement composition using a hydraulic inorganic material such as cement, products thereof and a manufacturing process thereof.

2. Description of the Related Art

The following description sets forth the inventor's knowledge of related art and problems therein and should not be construed as an admission of knowledge in the prior art.

Hitherto, Asbestos has been used as reinforcement of fiber reinforced cement products. Recently, however, woody reinforcements such as wood flakes and wood fibers and organic synthesis fibers have come to be used instead of conventional asbestos since environmental pollution (such as pneumoconiosis) caused by flying of fine powder of asbestos has become a serious problem.

Even more particularly, in late years, as for the crystalline silica such as quartz, tridymite, cristobalite, it is said to asbestos similar that harmful effect may be given to human body in siliceous.

Therefore administrative level/allowable concentration of crystalline silica as dust is established in ACGIH (American Conference of Governmental Industrial Hygienists) and OSHA (Occupational Safety & Health Administration).

For example, allowable concentration of aspiration of crystalline silica-related dust is established in ACGIH as follows:

Quartz is no more than 0.05 $mg/m^3$,

Cristobalite is no more than 0.05 $mg/m^3$,

Tridymite is no more than 0.05 $mg/m^3$.

On the other hand, allowable concentration of aspiration characteristics dust of water-insoluble or the poor solubility material which cannot be classified elsewhere except crystalline silica is lower than 3 $mg/m^3$, and allowable concentration of aspiration characteristics dust of crystalline silica is much severer.

In addition, in Japan, Nihon Sangyo health society assumes that a crystalline silica can be judged by enough evidence from an epidemiologic study for human if cancer-causing based on announced sorting of International Agency for Research on Cancer, and it is established in the first subgroup same as asbestos.

The description herein of advantages and disadvantages of various features, embodiments, methods, and apparatus disclosed in other publications is in no way intended to limit the present invention.

For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY OF THE INVENTION

The preferred embodiments of the present invention have been developed in view of the above-mentioned and/or other problems in the related art.

The preferred embodiments of the present invention can significantly improve upon existing methods and/or apparatuses.

Among other potential advantages, some embodiments can provide fiber reinforced cement product and the manufacturing process which are safe for human body, and, even more particularly, it is to provide fiber reinforced cement product and the manufacturing process that bending strength and dimensional stability and construction characteristics such as nail performance are preferable.

According to one aspect of some embodiments of the present invention, fiber reinforced cement composition comprising the following material constitution as a gateway to solve the conventional assignment: a hydraulic inorganic material, a siliceous material and woody reinforcement, wherein the siliceous material is amorphous material.

It is the amorphous siliceous material which siliceous material of fiber reinforced cement composition of the present invention does not contain crystalline silica.

Even if dust dances in the case of manufacturing process of fiber reinforced cement product and a work operation of product in itself such as construction, it is safe for human body.

Even more particularly, it is effective in can get the fiber reinforced preparation that bending strength, dimensional stability and construction characteristics such as nail performance are preferable.

The above and/or other aspects, features and/or advantages of various embodiments will be further appreciated in the following description in conjunction with the accompanying figures.

Various embodiments can include and/or exclude different aspects, features and/or advantages where applicable.

In addition, various embodiments can combine one or more aspect or feature of other embodiments where applicable.

The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE INVENTION

Figure 1:
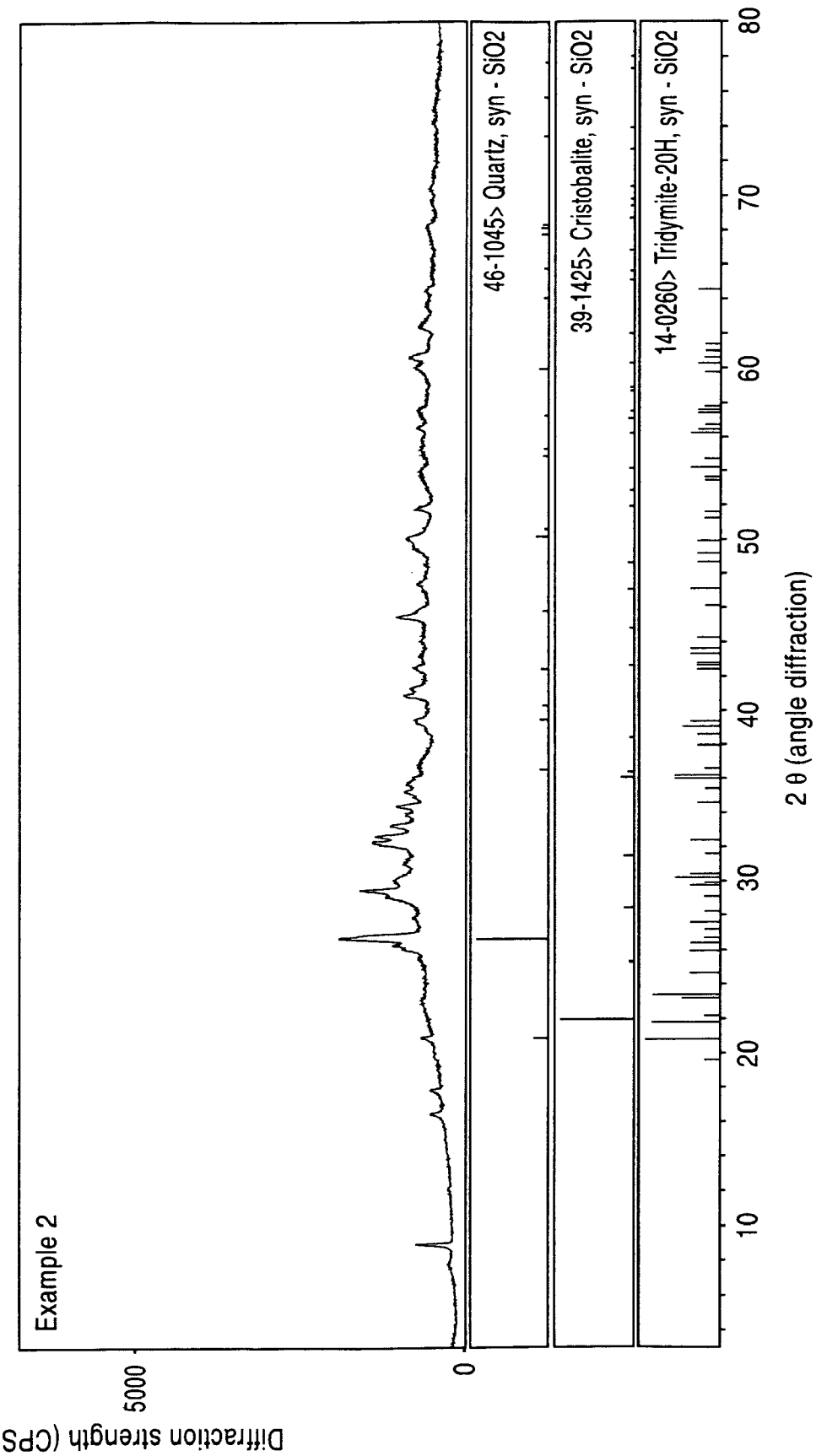
FIG. 1 is diagramatic chart of X-ray diffraction of fiber reinforced cement product of Example 2 in the present invention, and diffraction strength is shown to vertical scale, and angle of diffraction is shown to horizontal scale.

In the following paragraphs, the present invention will be explained in detail below.

At first, each of the raw materials of fiber reinforced cement composition is explained.

[Siliceous Material]

A siliceous material refers to a material which contains silica ($SiO_2$) as a chemical component.

In the present invention, examples of the siliceous material include silica sand, silica powder, diatomaceous earth, silica fume, fly ash, bottom ash, blast furnace slag, steel slag and sodium silicate.

It is preferable in the present invention to use at least one of blast furnace slag, silica fume, fly ash, perlite powder and glass powder.

Blast furnace slag is almost amorphous material, and there is not apprehension of health problem.

It is preferable that the blast furnace slag contains not less than 20% by mass and not more than 40% by mass of $SiO_2$ component.

Silica fume is almost amorphous material, too.

Although silica fume contains cristobalite in a very small amount depending on the type.

However, as for the silica fume, crystalline silica disappears by hydrothermal reaction so that specific surface area of cement by Blaine and activity are high.

Incidentally, specific surface area of cement by Blaine represents fineness of a powder and refers to a specific surface area measured by permeability method (Blain air permeability test).

It is preferable that the silica fume contains not less than 97% by mass of $SiO_2$ component.

Fly ash contains some crystalline silica depending on the type (about 10% by mass includes quartz). However, by finely dividing fly ash into a particle size of not more than 15 μm, the reaction activity is enhanced.

Thus a major part of the trace amount of crystalline silica contained in the fly ash is converted to calcium silicate hydrates in an autoclave cure and crystalline silica almost disappears.

In addition, reaction activity of fly ash increases by finely dividing fly ash into a particle size of not more than 15 μm, and bending strength enhancement of fiber reinforced cement product is contributed to.

It is preferable that the fly ash contains not less than 50% by mass and not more than 70% by mass of $SiO_2$ component.

Glass powder is glassy and the siliceous content varies depending on the type.

By using a kind of glass powder having high silica content, an aimed performance of the resulting base material can be obtained.

Perlite is composed mainly of glassy substances and the siliceous content thereof is as high as about 80% by mass.

If it is pulverized for use, an aimed performance of the resulting base material can be obtained.

Glass powder and perlite powder are amorphous material, and there is not a problem in health.

In addition, siliceous lightweight materials such as expanded perlite and shirasu-balloon may be used as siliceous material.

It is possible to judge whether or not silica is crystalline by the appearance of the crystalline peaks of crystalline silica contained in quartz, tridymite or cristobalite by X-ray diffraction.

In other words, quartz, cristobalite and tridymite are crystalline and thus if the peaks of quartz, cristobalite or tridymite in X-ray diffraction are clearly observed in a siliceous material, the siliceous component contained in the siliceous material is crystalline rather than amorphous.

Accordingly, such a siliceous material in which the peaks observed in quartz or the like in X-ray diffraction are hardly observed is used in the present invention.

When fly ash is used as the siliceous material, while fly ash is very inexpensive and thus economical and, in addition, the resulting product such as an external wall board is excellent in nail performance because the shape of fly ash is spherical, it has a low specific gravity compared with silica sand.

Thus, the resulting product is inevitably low in specific gravity.

Thus, by replacing a part of the fly ash component with silica fume, specifically, replacing not less than 3% by mass and not more than 7% by mass of fly ash with silica fume, it is possible to obtain a fiber reinforced cement product having a high strength, good flexibility performance and good nail performance without largely increasing the cost and without lowering the specific gravity of the product.

In addition, cost and specific gravity and bending strength of the resulting product can be set by using silica fume together with the finely dividing fly ash into a particle size of not more than 15 μm.

When a blast furnace slag is used as the siliceous material, by replacing not less than 5% by mass and not more than 20% by mass of blast furnace slag with silica fume, a fiber reinforced cement product having a high strength and good flexibility performance can be obtained.

The reason why the replacement with silica fume of blast furnace slag is larger than that of fly ash is that the $SiO_2$ component contained in blast furnace slag is less than that contained in fly ash.

In addition, it is possible to use blast furnace slag and fly ash in combination as the siliceous material.

In this case, not less than 30% by mass and not more than 70% by mass of blast furnace slag is optionally replaced with fly ash in compliance with a desired specific gravity.

Table 1

Table 1 shows, as an example, the analytical value of the chemical composition of each of the silica fume, fly ash and blast furnace slag used in the present invention.

[Hydraulic Inorganic Material]

A hydraulic inorganic material refers to a material which causes a hydration reaction upon contact with water to initiate hardening and includes cement and lime.

Among them, it is preferred to use Portland cement as the hydraulic inorganic material in the present invention.

The Portland cement includes ordinary Portland cement, high early strength Portland cement, ultra high early strength Portland cement, moderate heat Portland cement, sulfate resistant Portland cement (according to ASTM (American Society for Testing and Materials international) C150, Standard Specification for Portland Cement Type I, Type II, Type III, Type IV and Type V are included).

Amongst, ordinary Portland cement (according to ASTM C150, Type I, Type II or a blend thereof, and according to AASHTO (American Association of State Highway and Transportation Officials) M85, Type I) is inexpensive and is suitable for the use.

Table 2

Table 2 shows, as an example, analytical values of the chemical composition of the Portland cement used in the present invention and physical value of the Portland cement.

[Woody Reinforcement]

Examples of the woody reinforcement include woody pulp, wood fiber bundle, wood fiber, wood flake, wood wool and wood powder.

It is preferable to use woody pulp, more preferably needle-leaves-tree unbleached kraft pulp (NUKP), needle-leaves-tree bleached kraft pulp (NBKP), Laubholz unbleached kraft pulp (LUKP) and Laubholz bleached kraft pulp (LBKP), and particularly preferably needle-leaves-tree pulps such as NUKP and NBKP.

In addition, it is preferable to set the filtered water (freeness) of a pulp, i.e. the value measured according to Canada standard measurement (Canadian standard freeness, hereinafter, referred to CSF), which varies depending on the degree of beating of pulp, to be not more than 500 ml.

By using such a woody reinforcement of fine fibers, the woody reinforcement exists in a cement (powder) matrix in a high density to give a fiber reinforced cement product having an excellent toughness.

Even more particularly, it is possible to reduce the cost by using additionally used paper as woody reinforcement.

It is preferable to use used newspaper or corrugated cardboard as used paper.

By adding the used paper in an appropriate amount, mixing property with cement (powder) is enhanced, thereby providing a fiber reinforced cement product excellent in handling property and nail performance.

It is preferable to use the used paper having a fiber length of not less than 0.5 mm and not more than 3.0 mm, a fiber diameter of not less than 10 µm and not more than 100 µm, and a CSF of not more than 350 ml.

In addition, it is preferable to use two kinds of woody reinforcement in a ratio of NUKP (NBKP) to used paper in a range of from 4:1 to 1:1.

If the ratio of the used paper to NUKP (NBKP) is more than 1:1, the resulting product contains a small amount of long fibers and thus becomes difficult to develop strength, whereas if the ratio of NUKP (NBKP) to used paper is more than 4:1, mixing with cement (powder) becomes difficult.

In addition, a woody reinforcement having a CSF of not less than 500 ml may be added as an auxiliary material.

[Mica]

Mica contributes to dimensional stability of the product since it usually has a lamellar structure, is not hygroscopic and is a high elastic substance having a rigidity.

For example, if the product without mica contains 15 to 18% by mass of water when it is sold, the size of the product tends to shrink as the water content thereof decreases upon natural evaporation of the internal water under environmental conditions.

However, if the product contains mica, the dimension change of product is reduced.

The mica to use in the present invention is preferably flakes having an average particle size of not less than 200 µm and not more than 700 µm, and an aspect ratio of not less than 60 and not more than 100.

Incidentally, the aspect ratio herein means the ratio of thickness relative to a particle size.

[Water-Soluble Resin]

Examples of water-soluble resin include polyvinyl alcohol, carboxymethyl cellulose, methyl cellulose, polyethylene oxide and polyvinyl ether.

The water-soluble resin serves as a binder in the fiber reinforced cement product, enhances adhesion between the layers of the components contained in the product, and improves the strength, as well as freezing and fusion resistance of the product.

In addition, since the water-soluble resin has a water-retention action, it prevents the surface of the fiber reinforced cement composition from drying in the course of autoclave curing and acts to uniform the water content, thereby achieving a uniform hardening-curing reaction.

The desirable water-soluble resins are powdery polyvinyl alcohol resins having a saponification value of not less than 98% by mol.

Incidentally, the saponification value means a percentage of the number of hydroxyl group relative to the total number of acetate group and hydroxyl group contained in a polyvinyl alcohol resin in a saponification reaction (the reaction to synthesize a polyvinyl alcohol resin by substituting the acetate group in polyvinyl acetate with hydroxyl group).

A powdery polyvinyl alcohol resin having a saponification value of not less than 98% by mol is not soluble in water but merely swells at a normal temperature, and thus does not dissolve in the water of aqueous slurry of raw materials at a normal temperature.

Therefore, in the after-mentioned slurry forming process, outflow of a polyvinyl alcohol resin is reduced, whereby the process yield does not lower, and the viscosity of the slurry does not raise, whereby the forming efficiency does not lower.

In addition, in the green sheet prepared by forming slurry of raw materials, the powdery polyvinyl alcohol resin comes to dissolve in the water contained in the green sheet owing to the high temperature in an autoclave curing process.

Because the water content of the green sheet is low, a major part of the powdery polyvinyl alcohol resin remains in the green sheet in a balloon state in which the powdery polyvinyl alcohol resin is dissolved in water and a large amount of the polyvinyl alcohol resin in the balloon state exists in the final product, fiber reinforced cement product.

Thus the product is provided with a cushioning property due to the effect of the shape of the balloon, whereby the internal stress which generates during freezing and fusion is absorbed and alleviated to enhance freezing and fusion resistance.

Furthermore, when a water-soluble resin is added, the water-soluble resin coats the surface of the particles of cement as a protecting colloid, which possibly affects the hydration reaction of the cement.

However, when a powdery polyvinyl alcohol resin is used, a major part of the resin remains in a state of balloon in the green sheet. Thus it becomes difficult to coat the cement particles with the polyvinyl alcohol resin as a protecting colloid, whereby the effect of the resin on the hydration reaction of the cement is reduced.

[Other Component]

As the other components, the following components may be optionally added: mineral powders such as vermiculite, bentonite and dolomite; inorganic fibers such as wollastonite and glass fiber; organic fibers such as polypropylene fiber, acrylic fiber and aramid fiber; cement setting accelerators such as sodium aluminate, calcium formate, potassium sulfate, calcium sulfate, aluminum sulfate and calcium acetate; water-repellents or water-proofing agents such as wax, paraffin, silicon and surfactant; and pulverized waste materials such as pulverized wood cement boards and inorganic boards.

Incidentally, these illustrations do not limit the present invention.

Next, the composition of the raw materials for above-mentioned fiber reinforced cement composition is explained.

[Raw Material Composition of the Fiber Reinforced Cement Composition]

It is preferable to add as the raw materials of the fiber reinforced cement composition not less than 25% by mass and not more than 45% by mass of the hydraulic inorganic material, not less than 50% by mass and not more than 65% by mass of the amorphous siliceous material, not less than 5% by mass and not more than 12% by mass of the woody reinforcement, not less than 1% by mass and not more than 7% by mass of mica, and not less than 0.25% by mass and not more than 1.5% by mass of a water-soluble resin.

If the amount of the hydraulic inorganic material is less than 25% by mass, development of the strength of the product after first hardening is not sufficient, whereas if it is more than 45% by mass, the resulting product becomes rigid and fragile.

If the amount of the amorphous siliceous material is less than 50% by mass, a siliceous component which reacts in a calcium silicate reaction is not enough, whereas if it is more than 65% by mass, a calcium component is not enough to leave an unreacted siliceous component.

If the amount of woody reinforcement is less than 5% by mass, a problem with regard to toughness of the product occurs, whereas if it is more than 12% by mass, uniform dispersion thereof in the raw materials becomes difficult.

If the amount of mica is less than 1% by mass, it does not contribute to the dimensional stability of the resulting fiber reinforced cement product, whereas if it is more than 7% by mass, uniform dispersion thereof in the raw materials becomes difficult.

In addition, if the amount of the water-soluble resin is less than 0.25% by mass, it does not contribute to the development of strength, whereas if it is more than 1.5% by mass, improvement in the physical properties of resulting product is not achieved.

An optimal mass ratio of the CaO to $SiO_2$ (CaO:$SiO_2$) for the reaction between the hydraulic inorganic material and the amorphous siliceous material, particularly for developing strength via a cement hydration reaction and via a calcium silicate reaction in the combined materials of the hydraulic inorganic material and the amorphous siliceous material is set to be in a range of from 23:77 to 60:40.

It is possible to set mass ratio of CaO to $SiO_2$ to be in a range of from 23:77 to 60:40 by analyzing the chemical composition each of the hydraulic inorganic material and the amorphous siliceous material.

For example, if the ordinary Portland cement shown in Table.2 ($SiO_2$:20.5% by mass, $Al_2O_3$:4.3% by mass, $Fe_2O_3$: 2.7% by mass, CaO:63.7% by mass, and MgO:2.6% by mass, $SO_3$:2.8% by mass) is used as the hydraulic inorganic material in an amount of 30% by mass of the whole solid content, and as the amorphous siliceous material, the silica fume shown in Table.1 ($SiO_2$:98.0% by mass, $Al_2O_3$:0.23% by mass, $Fe_2O_3$:0.62% by mass, CaO:0.07% by mass, MgO: 0.36% by mass, $SO_3$:0.09% by mass) is used in an amount of 3% by mass of the whole solid content and fly ash shown in Table.1 ($SiO_2$:56.8% by mass, $Al_2O_3$:28.5% by mass, $Fe_2O_3$: 7.3% by mass, CaO:1.4% by mass, and MgO:0.96% by mass, and $SO_3$:0.46% by mass) is used in an amount of 53% by mass of the whole solid content, the content of CaO is calculated to be 19.854 (30×0.637+3×0.0007+53×0.014=19.854) and the content of $SiO_2$ is calculated to be 39.314 (30×0.205+3×0.98+53×0.568=39.314), whereby the ratio CaO: $SiO_2$ is 19.854:39.314≈34:65.

In addition, as another example, if the ordinary Portland cement shown in Table.2 ($SiO_2$:20.5% by mass, $Al_2O_3$:4.3% by mass, $Fe_2O_3$:2.7% by mass, CaO:63.7% by mass, MgO: 2.6% by mass, $SO_3$:2.8% by mass) is used as the hydraulic inorganic material in an amount of 30% by mass of the whole solid content, and the fly ash shown in Table.1 ($SiO_2$:56.8% by mass, $Al_2O_3$:28.5% by mass, $Fe_2O_3$:7.3% by mass, CaO: 1.4% by mass, MgO:0.96% by mass, $SO_3$:0.46% by mass) is used as the siliceous material in an amount of 28.0% by mass of the whole solid content, and the blast furnace slag shown in Table.1 ($SiO_2$:33.1% by mass, $Al_2O_3$:13.7% by mass, $Fe_2O_3$: 0.23% by mass, CaO:43.0% by mass, MgO:5.5% by mass, $SO_3$:2.0% by mass) is used as the amorphous siliceous material in an amount of 28.0% by mass of the whole solid content, the content of CaO is calculated to be 31.542 (30×0.637+28×0.014+28×0.43=31.542) and the content of $SiO_2$ is calculated to be 31.322 (30×0.205+28×0.568+28×0.331=31.322), whereby the mass ratio CaO:$SiO_2$ is 31.542:31.332≠50:50.

A preferable mass ratio is obtained by using as the hydraulic inorganic material not less than 28% by mass and not more than 32% by mass of Portland cement, and as the amorphous siliceous material not less than 54% by mass and not more than 58% by mass in total of fly ash and silica fume, wherein the amount of the silica fume is not less than 3% by mass and not more than 7% by mass of the whole siliceous material consisting of the fly ash and the silica fume. In this case, the mass ratio CaO:$SiO_2$ is in a range of from 30:70 to 40:60.

Another preferable mass ratio is obtained by using as the hydraulic inorganic material not less than 28% by mass and not more than 32% by mass of Portland cement, and as the amorphous siliceous material not less than 54% by mass and not more than 58% by mass in total of blast furnace slag and silica fume, wherein the amount of the silica fume is not less than 5% by mass and not more than 20% by mass of the whole siliceous material consisting of the blast furnace slag and the silica fume. In this case, the mass ratio CaO:$SiO_2$ is in a range of from 50:50 to 60:40.

Another preferable mass ratio is obtained by using as the hydraulic inorganic material not less than 28% by mass and not more than 32% by mass of Portland cement, and as the amorphous siliceous material not less than 54% by mass and not more than 58% by mass in total of fly ash and blast furnace slag, wherein the amount of the fly ash is not less than 30% by mass and not more than 70% by mass of the whole siliceous material consisting of the fly ash and the blast furnace slag. In this case, the mass ratio CaO:$SiO_2$ is in a range of from 40:60 to 60:40.

A process for manufacturing a fiber reinforced cement product is explained below.

[Manufacturing Process]

In the present invention, in a process for manufacturing a fiber reinforced cement product, the above-mentioned composition is mixed with water to give slurry of raw material.

The concentration of slurry is in a range of from 3 to 15% by mass reduced to a concentration of solid content.

It is desirable to add silica fume in the form of slurry obtained by mixing it with water with stirring rather than in the form of powder, with the slurry having a concentration of approximately 30% by mass being most readily handled.

The slurry of raw materials is manufactured by a wet process.

Examples of the wet manufacturing processes include Hatschek process, flow on process, filter pressing process, roll forming, extrusion, injection, Mazza pipe process, Magnani sheet process, hand lay-up process, molding and casting.

Flow on process is employed for forming herein.

Namely, the slurry of raw materials is flow down on a felt and dehydrated while forming to give a green sheet, and the green sheet is rolled up around a making roll to give a multi-layer sheet.

When the thickness of multi-layer sheet reaches a predetermined thickness, the sheet is separated from the making roll to give a green mat.

The number of rolling around the making roll is preferably 6 to 15.

Then, the mat is pressed with a pressure of 2 to 5 MPa.

The sheet is rolled up around the making roll in layers in Hatschek process like in flow on process.

In the case where Hatschek process is employed, plural vessels each accommodating a cylinder are provided and a felt is run on the cylinders in the vessels to transfer the raw materials to the felt.

Therefore the green sheet which was formed and dehydrated on the felt and rolled up around the making roll has a laminar structure having the number of layers equivalent to the number of the vessel and has a freezing and fusion resistance inferior to that of a sheet obtained by the flow on process.

On the contrary, when the flow on process is employed, the resulting green sheet itself does not have a laminar structure but the resulting green mat has a laminar structure having the number of layers equivalent to the number of rolling up around the making roll and thus has a freezing and fusion resistance better than that of the mat obtained by the Hatschek process.

Therefore, it is preferable to adopt the flow on process.

The press mat obtained by pressing the green mat is hardened at 40 to 80° C. for 12 to 24 hours and then cured in an autoclave.

Curing in an autoclave is preferably effected by raising the temperature to 150 to 180° C. in 3.5 hour, keeping the temperature for 6.5 hour and lowering the temperature in 6 hours.

Upon autoclave curing under such conditions, a siliceous component and an alumina component elute from the surface of mica, thereby roughening the surface of mica.

In addition, the calcium component eluted from cement or the like is liable to enter into the space among overlapped parts of mica fragments, and the calcium component reacts with the siliceous component and some amount of the alumina component both eluted from the surface of mica to produce a stable calcium silicate hydrate in the space among the overlapped parts of mica fragments, thereby firmly adhering the mica fragments.

During the autoclave curing, a kind of tobermorite having a card house structure which has a better crystalline property than that of the other kind of tobermorite is produced in a large amount, thereby enhancing the dimensional stability, as well as the freezing and fusion resistance of product.

If the amount of the calcium component is too much relative to the amount of the silica component, a cement hydration predominantly occurs rather than a calcium silicate reaction, whereby the product becomes fragile and the crack resistance lowers.

On the contrary, if the amount of the siliceous component is too much relative to the amount of the calcium component, unreacted siliceous component remains in a large amount and the amount of tobermorite produced is decreased, thereby lowering the freezing and fusion resistance of product.

In addition, during the autoclave curing, a very small amount of crystalline silica included in silica fume and fly ash reacts to become calcium silicate hydrate, thereby crystalline silica approximately disappears

[Product]

Application of the fiber reinforced cement composition includes fiber reinforced cement siding, glass fiber reinforced cement board, pulp reinforced cement board, wood fiber reinforced cement calcium silicate board, fiber reinforced cement calcium silicate board, slag cement perlite board and the like, and all of these final products are referred to as fiber reinforced cement products.

[Coating Method]

Coating of the fiber reinforced cement product is effected, for example, by coating with sealer the front face two times and the ends and the rear face once, applying an undercoating such as an aqueous emulsion type acryl resin paint or a silicon resin paint, applying an intermediate coating, and then applying a top coating such as an organic solvent solution type acryl resin paint, an aqueous emulsion type acryl resin paint or an organic solvent solution type silicon acryl resin paint.

[Installation Method]

As a method for installation of the product of the fiber reinforced cement composition, it is preferable to effect, for example, in the case of fiber reinforced cement siding, by nailing a first siding at the positions about 20 mm inside from the upper edge thereof, placing a second siding in such a manner that the lower edge of the second siding overlaps the upper edge of the first siding by not less than 30 mm, and then nailing the second siding at the positions about 20 mm inside from the upper edge thereof according to a so-called lap boarding.

DESCRIPTION OF THE PREFERRED EMBODIMENTS

In the following paragraphs, some preferred embodiments of the invention will be described with reference to the attached drawings by way of example and not limitation.

It should be understood based on this disclosure that various other modifications can be made by those in the art based on these illustrated embodiments.

Embodiment 1

An example of the present invention will be illustrated by Embodiment 1.

Table 3

Table 3 shows the compositions of the raw material in Examples 1-10 according to the present invention.

The raw materials are mixed in the formulation ratio shown in the Table, and water is added thereto to give slurry of raw material having a solid concentration of 10% by mass.

The slurry is caused to flow down on a felt and dehydrated with forming to give a green sheet.

The green sheet is rolled up around a making roll to have a multilayer structure.

When the thickness of the sheet reaches a predetermined value, the sheet is separated from the making roll to give a green mat.

The mat is pressed with pressure of 5 MPa, cured at 80□ for 15 hours, and further cured in an autoclave at 170° C. for 7 hours to provide a sample of fiber reinforced cement product.

Table 4

Table 4 shows physical properties of the products of Examples 1-10 according to the present invention.

Bending strength and Young's modulus are measured using a test piece of 500×400 mm (according to JIS A 1408).

Elongation ratio through water absorption is an elongation ratio of a test piece before and after absorption of water caused by air conditioning the test piece at 60° C. for 3 days and then immersing it in water for 8 days to allow absorption of water.

Contraction ratio through moisture effusion is a contraction ratio of a test piece before and after moisture effusion caused by air conditioning the test piece at 20° C. under RH of 60% for 10 days and then drying it at 80° C. for 10 days to allow moisture effusion.

Microcracking test (cycle) means the number of cycles until cracks occur, wherein one cycle consists of a absorption-drying procedure repeated 3 times in one week, said procedure consisting of carbonation for 4 days, water absorption for 7 hours and drying at 170° C. for 17 hours.

Freezing and fusion resistance is a percentage of expansion in thickness after 300 cycles according to ASTM C166-B method.

Nailing performance is determined by observing generation of cracks when two fiber reinforced cement products which are laid to overlap with each other by 30 mm according to the lap boarding are pegged with nails of 2.3 mm in diameter and 38 mm in length by means of nailer gun at the positions of the overlapped part of the products 20 mm inside from the edges of the overlapped part in the longitudinal direction and in the shorter direction in compliance with actual installation.

The mark "○" denotes no cracking and the mark "×" denotes generation of cracks.

The presence of crystalline silica was determined by appearance of the peaks observed in crystalline silica such as quartz, tridymite or cristobalite in an X-ray diffraction.

Example 1

The fiber reinforced cement product of Example 1, in which the silica fume is used as siliceous material, the product does not contain crystalline silica.

In addition, various physical properties of the products of Example 1 have superior value in Table 4.

Example 2

The fiber reinforced cement product of Example 2, in which the fly ash and the silica fume are used as siliceous material.

FIG. 1 shows diagramatic chart of X-ray diffraction of the fiber reinforced cement product of Example 2 in which sample is prepared from the product and is measured, and peak location of quartz, cristobalite and tridymite are attached as authentic sample under diagramatic chart of sample.

For example, quartz has the first peak in the vicinity of 26.5 θ and the second peak in the vicinity of 21θ, cristobalite has the first peak in the vicinity of 22 θ and the second peak in the vicinity of 36θ, tridymite has the first peak in 21 θ weak neighborhood and the second peak in 22 θ weak neighborhood.

When this diagramatic chart is identified from the first peak and the second peak, it is confirmed that it is only quartz that the first peak and the second peak are observed together, there is not peak of cristobalite and tridymite.

The peak of quartz is surely confirmed, but, the diffraction strength (peak height) of quartz is compared with the comparison of using silica sand as siliceous material in the after-mentioned, the diffraction strength of quartz is considerably weak.

Therefore, it is thought that the product scarcely contains crystalline silica and does not have an influence on human body.

Figure 2:
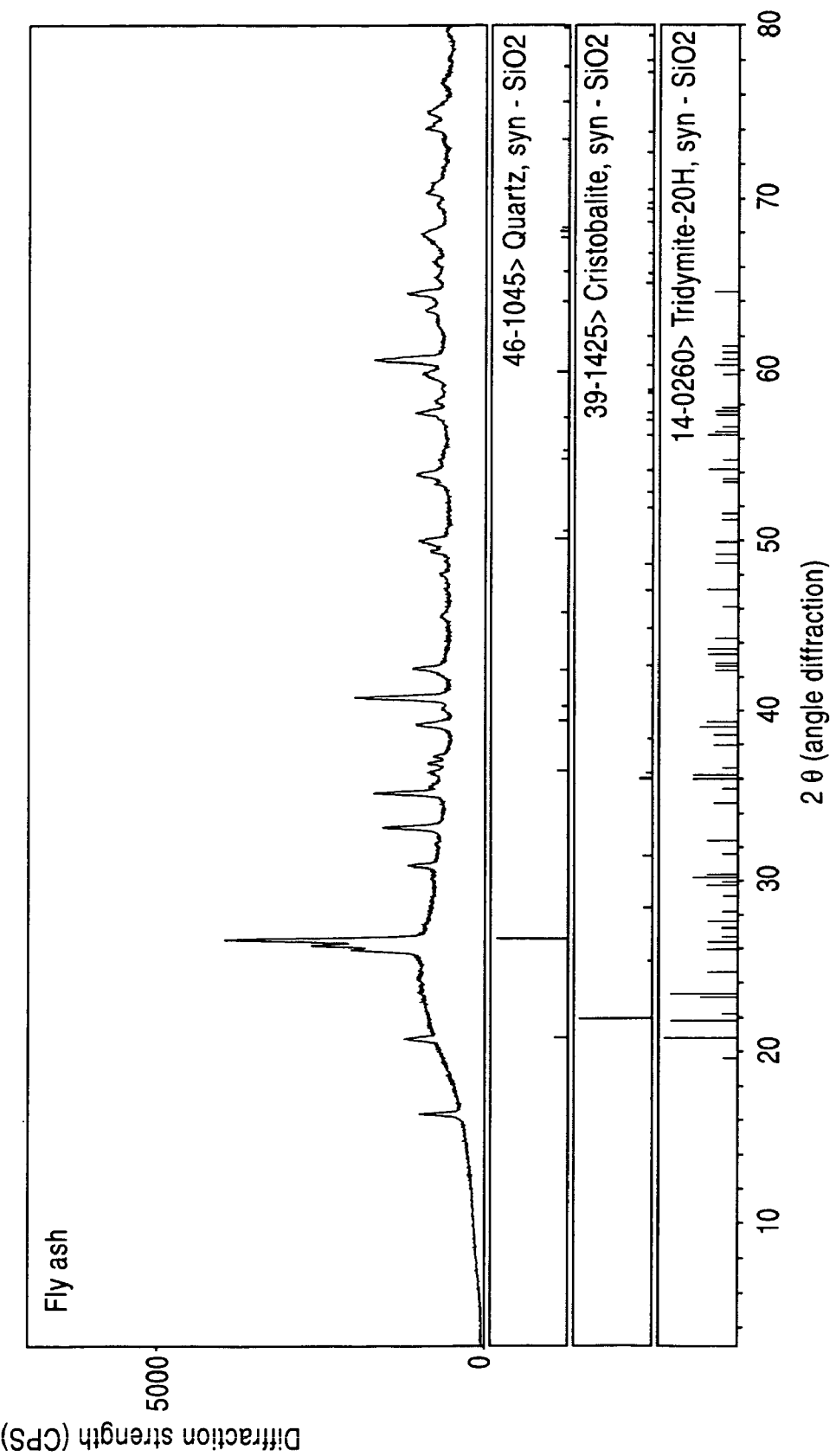
FIG. 2 is diagramatic chart of X-ray diffraction of fly ash used for the present invention, and diffraction strength is shown to vertical scale, and angle of diffraction is shown to horizontal scale.

FIG. 2 shows diagramatic chart of X-ray diffraction of the fly ash which is used for the present invention.

When peak manifestation strength of the fly ash is compared with comparison 2 (FIG. 5) in which the silica sand and silica fume are used as siliceous material in the after-mentioned, it is understood that the fly ash contains few crystalline silica.

Furthermore, as for the peak manifestation strength of quartz, when FIG. 1 is compared with FIG. 2, fly ash is high clearly.

Thus, crystalline silica which is included in fly ash responds at autoclave curing, and crystalline silica changes into calcium silicate hydrate, and that crystalline silica disappears is understood.

In addition, various physical properties of the products of Example 2 have superior value in Table 4.

Example 3

The fiber reinforced cement product of Example 3, in which the finely dividing fly ash and the silica fume are used as siliceous material.

Figure 3:
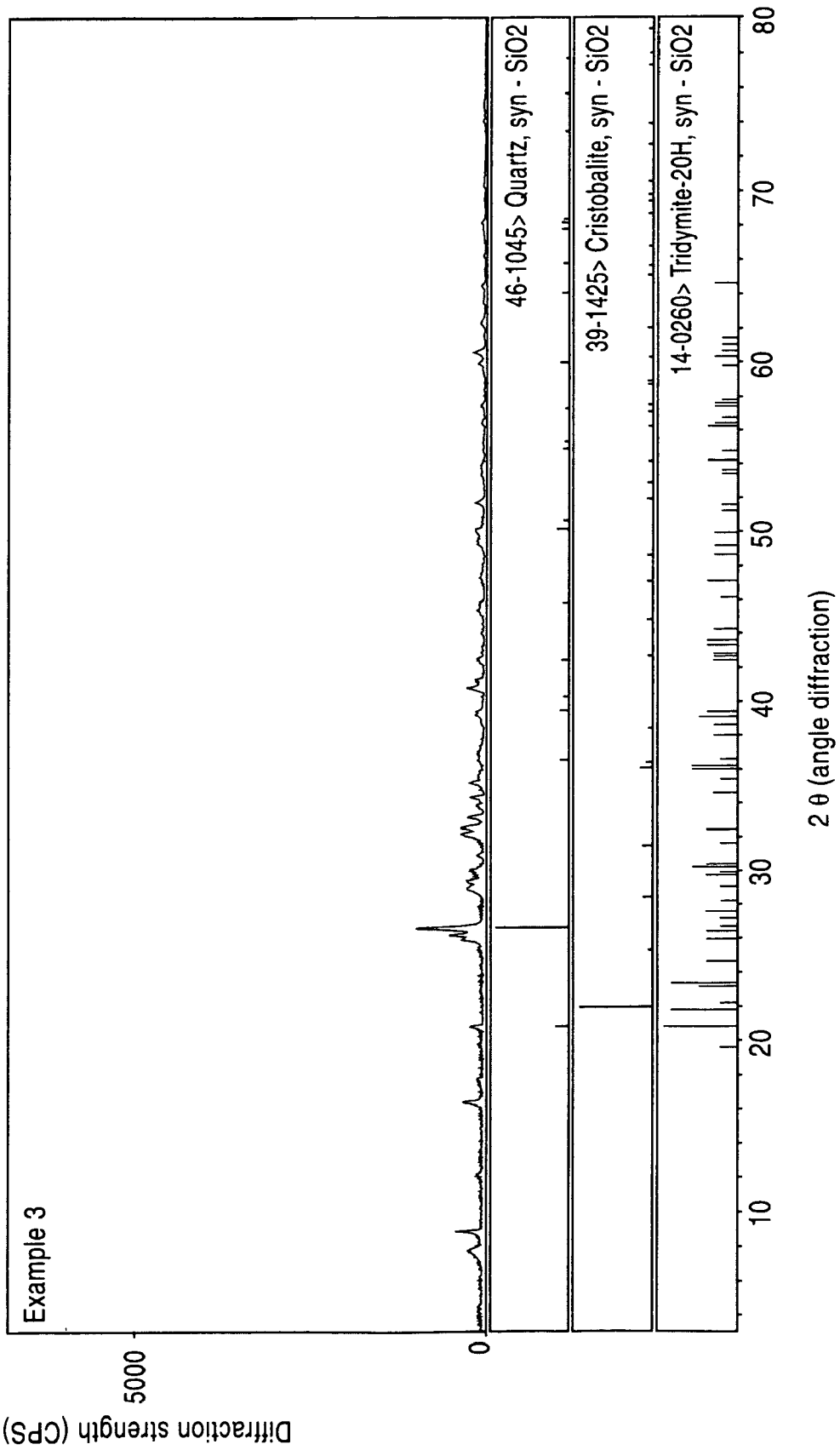
FIG. 3 is diagramatic chart of X-ray diffraction of fiber reinforced cement product of Example 3 in the present invention, and diffraction strength is shown to vertical scale, and angle of diffraction is shown to horizontal scale.

FIG. 3 shows diagramatic chart of X-ray diffraction of the fiber reinforced cement product of Example 3 in which sample is prepared from the product and is measured, and peak location of quartz, cristobalite and tridymite are attached as authentic sample under diagramatic chart of sample.

For example, quartz has the first peak in the vicinity of 26.5 θ and the second peak in the vicinity of 21θ, cristobalite has the first peak in the vicinity of 22 θ and the second peak in the vicinity of 36θ, tridymite has the first peak in 21 θ weak neighborhood and the second peak in 22 θ weak neighborhood.

When this diagramatic chart is identified from the first peak and the second peak, it is confirmed that it is only quartz that the first peak and the second peak are observed together, there is not peak of cristobalite and tridymite.

The peak of quartz is surely confirmed, but, the diffraction strength (peak height) of quartz is compared with the comparison of using silica sand as siliceous material in the after-mentioned, the diffraction strength of quartz is considerably weak.

Therefore, it is thought that the product scarcely contains crystalline silica and does not have an influence on human body.

Furthermore, it cannot assert clearly so that longitudinal diffraction strength range is different a little, when peak manifestation of Example 3 is compared with Example 2 using the fly ash which does not divided finely, peak manifestation are weaker than Example 2. Thus, by dividing finely the fly ash, the activity of reaction becomes high, and it is thought that, even more particularly, crystalline silica included in fly ash disappears.

In addition, various physical properties of the products of Example 3 have superior value in Table 4.

Example 4

The fiber reinforced cement product of Example 4, in which the blast furnace slag and the silica fume are used as siliceous material.

Figure 4:
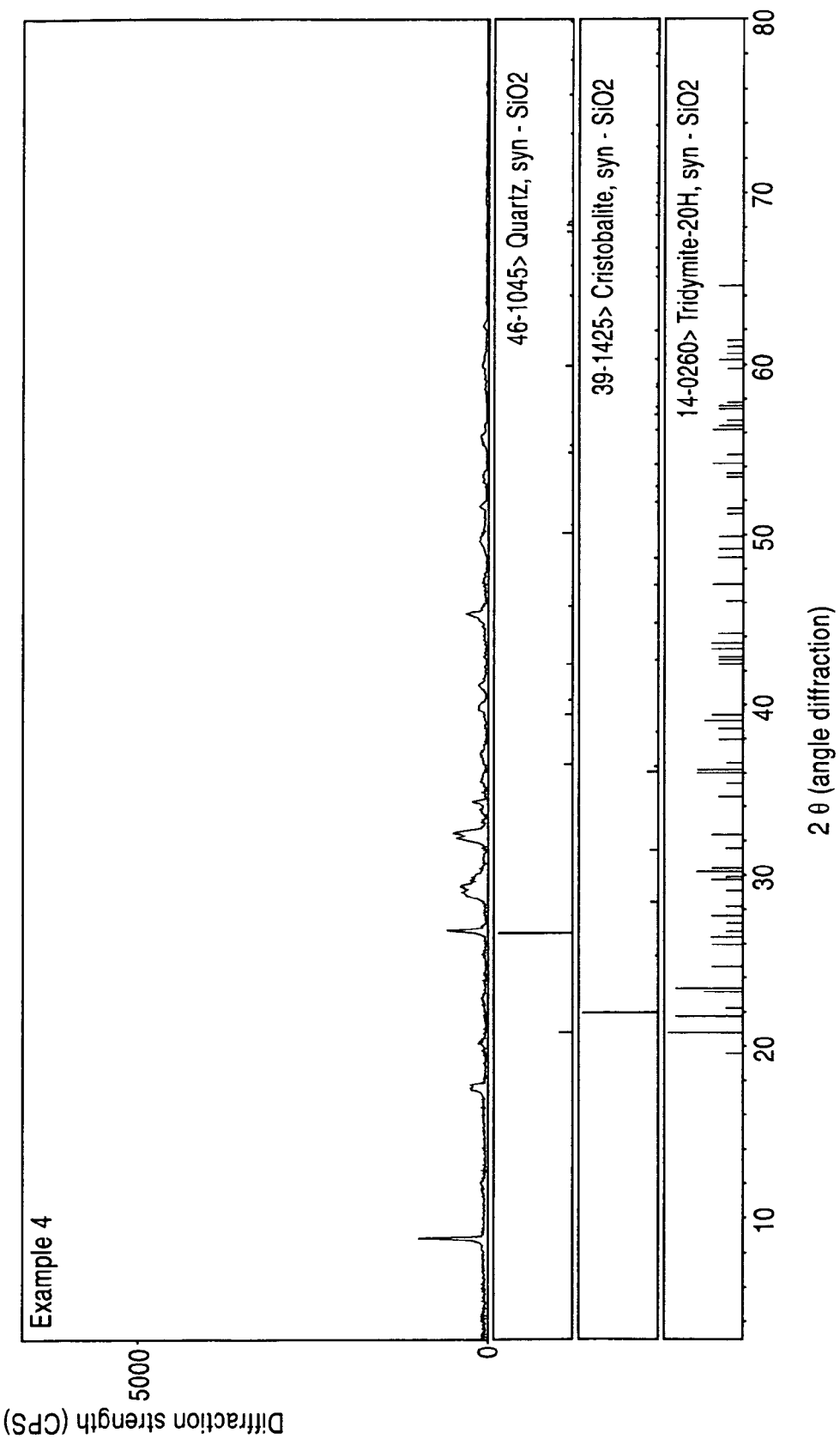
FIG. 4 is diagramatic chart of X-ray diffraction of fiber reinforced cement product of Example 4 in the present invention, and diffraction strength is shown to vertical scale, and angle of diffraction is shown to horizontal scale.

FIG. 4 shows diagramatic chart of X-ray diffraction of the fiber reinforced cement product of Example 4 in which sample is prepared from the product and is measured, and peak location of quartz, cristobalite and tridymite are attached as authentic sample under diagramatic chart of sample.

When this diagramatic chart is identified from the first peak and the second peak, the first peak and the second peak of quartz, cristobalite or tridymite are not confirmed together.

Thus, it is thought that product does not contain crystalline silica.

In addition, various physical properties of the products of Example 4 have superior value in Table 4.

Example 5

The fiber reinforced cement product of Example 5, in which the perlite powder and the silica fume are used as siliceous material, the product does not contain crystalline silica.

In addition, various physical properties of the products of Example 5 have superior value in Table 4.

Example 6

The fiber reinforced cement product of Example 6, in which the glass powder and the silica fume are used as siliceous material, the product does not contain crystalline silica.

In addition, various physical properties of the products of Example 6 have superior value in Table 4.

Example 7

The fiber reinforced cement product of Example 7, in which the blast furnace slag and the fly ash are used as siliceous material, the product scarcely contains crystalline silica.

In addition, various physical properties of the products of Example 7 have superior value in Table 4.

Example 8

The fiber reinforced cement product of Example 8, in which the blast furnace slag, the fly ash and the silica fume are used as siliceous material, the product scarcely contains crystalline silica.

In addition, various physical properties of the products of Example 8 have superior value in Table 4.

Example 9

The fiber reinforced cement product of Example 9, in which the blast furnace slag, the fly ash and the silica fume are used as siliceous material, the product scarcely contains crystalline silica.

In addition, various physical properties of the products of Example 9 have superior value in Table 4.

Example 10

The fiber reinforced cement product of Example 10, in which the blast furnace slag and the silica fume are used as siliceous material, the product does not contain crystalline silica.

In addition, various physical properties of the products of Example 10 have superior value in Table 4.

Embodiment 2

Comparisons referring to the present invention are illustrated as Embodiment 2.

Table 5

Table 5 shows the compositions of raw materials of Comparison 1 to 6 in which samples of fiber reinforced cement products were manufactured by a process similar to that in the examples.

Table 6

Table 6 shows various physical properties of the products of Comparisons 1 to 6 in which samples of fiber reinforced cement products were measured in a manner similar to that in the example.

Comparison 1

The fiber reinforced cement product of Comparison 1, in which the silica sand is used as siliceous material, the product contains crystalline silica.

In addition, the product has a considerably low absolute dry specific gravity of 1.17, a very low bending strength of 11.9 N/mm$^2$ and a considerably poor freezing and fusion resistance of 6.3%.

Comparison 2

The fiber reinforced cement product of Comparison 2, in which the silica sand and silica fume are used as siliceous material.

Figure 5:
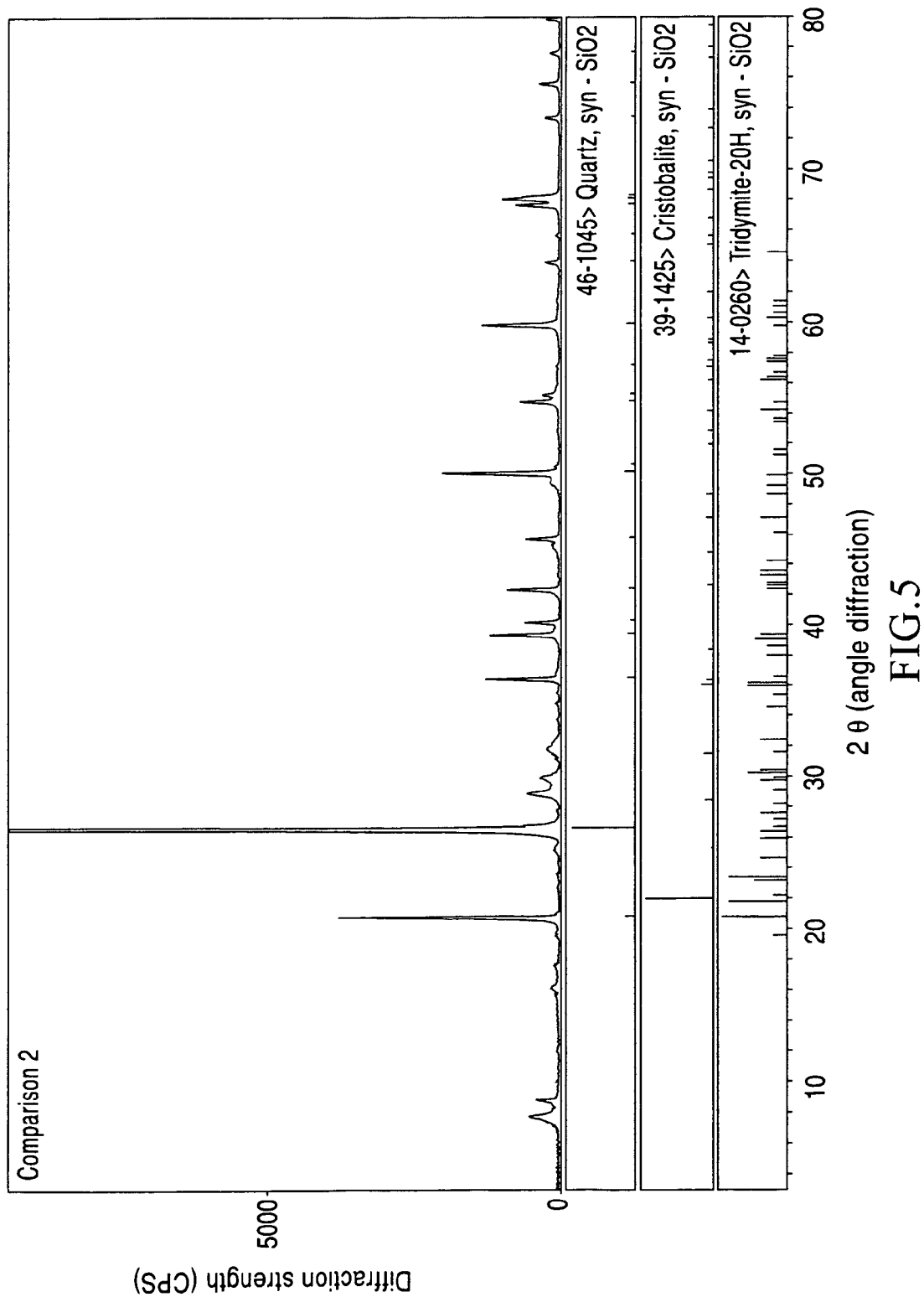
FIG. 5 is diagramatic chart of X-ray diffraction of fiber reinforced cement product of Comparison 2 in the present invention, and diffraction strength is shown to vertical scale, and angle of diffraction is shown to horizontal scale.

FIG. 5 shows diagramatic chart of X-ray diffraction of the fiber reinforced cement product of Comparison 2 in which sample is prepared from the product and is measured, and peak location of quartz, cristobalite and tridymite are attached as authentic sample under diagramatic chart of sample.

For example, quartz has the first peak in the vicinity of 26.5 θ and the second peak in the vicinity of 21θ, cristobalite has the first peak in the vicinity of 22 θ and the second peak in the vicinity of 36θ, tridymite has the first peak in 21 θ weak neighborhood and the second peak in 22 θ weak neighborhood.

When this diagramatic chart is identified from the first peak and the second peak, it is confirmed that it is only quartz that the first peak and the second peak are observed together, there is not peak of cristobalite and tridymite.

Besides, because the tenth peak of quartz can confirm manifestation well to a peak, it can be supposed that there is quartz of considerable dosage.

Thus, Comparison 2 contains crystalline silica.

In addition, the product has a considerably low absolute dry specific gravity of 1.18 and a considerably poor freezing and fusion resistance of 2.6%.

Comparison 3

The fiber reinforced cement product of Comparison 3, in which the silica sand and the silica fume are used as siliceous material, the product contains crystalline silica, has a considerably high absolute dry specific gravity of 1.55 and thus has a poor nail performance.

Comparison 4

The fiber reinforced cement product of Comparison 4, in which the silica sand is used as siliceous material, the product contains crystalline silica, has a slightly high absolute dry specific gravity of 1.38 and thus has a poor nail performance.

Comparison 5

The fiber reinforced cement product of Comparison 5, in which the silica sand and the silica fume are used as siliceous material, the product contains crystalline silica, has a considerably low absolute dry specific gravity of 1.11, a very low bending strength of 12.3 N/mm$^2$ and a considerably poor freezing and fusion resistance of 5.5%.

Comparison 6

The fiber reinforced cement product of Comparison 6, in which the silica sand is used as siliceous material, the product contains crystalline silica, has a considerably low absolute dry specific gravity of 1.07, a very low bending strength of 12.1 N/mm$^2$ and a considerably poor freezing and fusion resistance of 4.1%.

Figure 6:
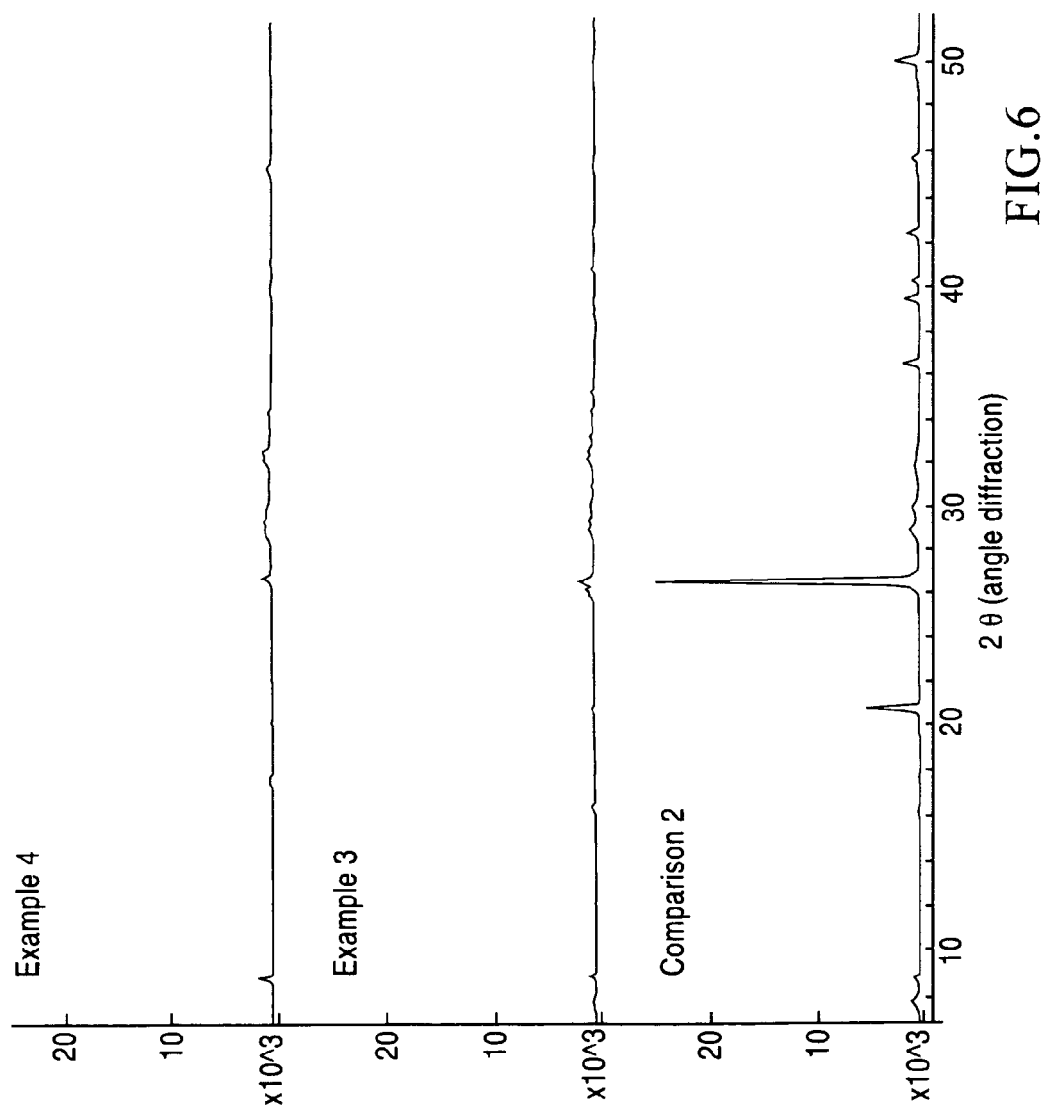
FIG. 6 shows X-ray diffraction diagramatic chart of Example 3, Example 4 and Comparison 2 in the present invention on one diagramatic chart for comparing.

In FIG. 6, X-ray diffraction of Example 3, Example 4 and Comparison 2 are compared to one diagramatic chart in a mass.

Scale of diffraction strength of Y-axis is different from FIG. 1 to 5. Peak manifestation of quartz is confirmed with Comparison 2.

In contrast, a peak of quartz is hardly observed in Example 3 and Example 4.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure.

The limitations in the claims are to be interpreted broadly based on the language employed in the claims and not limited to examples described in the present specification or during the prosecution of the application, which examples are to be construed as non-exclusive.

For example, in the present disclosure, the term "preferably" is non-exclusive and means "preferably, but not limited to".

In this disclosure and during the prosecution of this application, the terminology "present invention" or "invention" is meant as a non-specific, general reference and may be used as a reference to one or more aspect within the present disclosure.

The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims.

In this disclosure and during the prosecution of this application, the terminology "embodiment" can be used to describe any aspect, feature, process or step, any combination thereof, and/or any portion thereof, etc.

In some examples, various embodiments may include overlapping features.

TABLE 1

[CHEMICAL TEST REPORT FOR FLYASH, BLAST FURNACE SLAG, SILICA FUME]

| Flyash | | | Blast furnace slag | | | Silica fume | | |
|---|---|---|---|---|---|---|---|---|
| $SiO_2$ | 56.8 | (%) | $SiO_2$ | 33.1 | (%) | $SiO_2$ | 98.0 | (%) |
| $Al_2O_3$ | 28.5 | | $Al_2O_3$ | 13.7 | | $Al_2O_3$ | 0.23 | |
| $Fe_2O_3$ | 7.3 | | $Fe_2O_3$ | 0.23 | | $Fe_2O_3$ | 0.62 | |
| CaO | 1.4 | | CaO | 43.0 | | CaO | 0.07 | |
| MgO | 0.96 | | MgO | 5.5 | | MgO | 0.34 | |
| $SO_3$ | 0.46 | | $SO_3$ | 2.0 | | $SO_3$ | 0.09 | |
| $Na_2O$ | 0.36 | | $Na_2O$ | | | $Na_2O$ | 0.22 | |
| $K_2O$ | 2.4 | | $K_2O$ | | | $K_2O$ | 0.37 | |
| LOI | 2.6 | | LOI | 0.89 | | LOI | 1.1 | |

TABLE 2

[LABORATORY TEST REPORT FOR PORTLAND CEMENT]

| | | | Specification |
|---|---|---|---|
| Chemical Tests | | | |
| $SiO_2$ | 20.5 | (%) | |
| $Al_2O_3$ | 4.3 | | 6.0 Max. |
| $Fe_2O_3$ | 2.7 | | 6.0 Max. |
| CaO | 63.7 | | |
| MgO | 2.6 | | 6.0 Max. |
| $SO_3$ | 2.8 | | 3.0 Max. |
| LOI | 1.6 | | 3.0 Max. |
| $Na_2O$ | 0.27 | | |
| $K_2O$ | 0.68 | | |
| $Na_2O$ eq. | 0.71 | | |
| Ins. Res. | 0.23 | | 0.75 Max. |
| $C_3S$ | 63 | (%) | |
| $C_2S$ | 11 | | |
| $C_3A$ | 7 | | |
| $C_4AF$ | 8 | | |
| Physical Tests | | | |
| Specific Gravity | 3.15 | | |
| Compressive Strengths - (psi) | | | |
| 1 Day | 2590 | | |
| 3 Day | 4030 | | |
| 7 Day | 4910 | | |
| 28 Day | 5990 | | |
| Setting Time (Vicat) - (mins) | | | |
| Initial | 141 | | 60 Min. |
| Final | 246 | | 600 Max. |
| False Set | 81% | | 50 Min. |
| Blaine | 379 | | 280 Min. |
| % 325 Mesh | 96 | | |

TABLE 2-continued

[LABORATORY TEST REPORT FOR PORTLAND CEMENT]

|  |  | Specification |
|---|---|---|
| % Expansion | −0.01 | 0.80 Max. |
| % Air | 8 | 12 Max. |

TABLE 3

| Raw material composition (% by mass) | Example 1 | Example 2 | Example 3 | Example 4 | Example 5 | Example 6 | Example 7 | Example 8 | Example 9 | Example 10 |
|---|---|---|---|---|---|---|---|---|---|---|
| Portland cement | 30 | 30 | 30 | 30 | 30 | 30 | 30 | 30 | 30 | 28 |
| Blast furnace slag | 0 | 0 | 0 | 46 | 0 | 0 | 28 | 20 | 12 | 54 |
| Fly ash | 0 | 53 | 0 | 0 | 0 | 0 | 28 | 31 | 39 | 0 |
| Finely dividing fly ash | 0 | 0 | 53 | 0 | 0 | 0 | 0 | 0 | 0 | 0 |
| Silica fume | 56 | 3 | 3 | 10 | 3 | 3 | 0 | 5 | 5 | 4 |
| Perlite powder | 0 | 0 | 0 | 0 | 53 | 0 | 0 | 0 | 0 | 0 |
| Glass powder | 0 | 0 | 0 | 0 | 0 | 53 | 0 | 0 | 0 | 0 |
| NUKP | 8 | 0 | 0 | 4 | 8 | 8 | 8 | 8 | 8 | 8 |
| NBKP | 0 | 8 | 8 | 4 | 0 | 0 | 0 | 0 | 0 | 0 |
| Used newspaper | 2 | 2 | 2 | 2 | 2 | 2 | 2 | 2 | 2 | 2 |
| Mica | 3 | 3 | 3 | 3 | 3 | 3 | 3 | 3 | 3 | 3 |
| Polyvinyl alcohol resin | 1 | 1 | 1 | 1 | 1 | 1 | 1 | 1 | 1 | 1 |

TABLE 4

| Physical property | Example 1 | Example 2 | Example 3 | Example 4 | Example 5 | Example 6 | Example 7 | Example 8 | Example 9 | Example 10 |
|---|---|---|---|---|---|---|---|---|---|---|
| Presence or absence of crystalline silica | Not present | Scarcely present | Scarcely present | Not present | Not present | Not present | Scarcely present | Scarcely present | Scarcely present | Not present |
| Absolute dry specific gravity | 1.35 | 1.17 | 1.25 | 1.25 | 1.25 | 1.23 | 1.21 | 1.26 | 1.24 | 1.22 |
| Young's modulus(kN/mm$^2$) | 8.9 | 8.2 | 6.5 | 7.3 | 6.9 | 6.6 | 6.4 | 7.6 | 6.8 | 6.2 |
| Bending strength(N/mm$^2$) | 28.5 | 19.1 | 20.2 | 21.2 | 21.5 | 20.8 | 20.3 | 22.4 | 21.2 | 19.5 |
| Elongation ratio through water absorption(%) | 0.11 | 0.15 | 0.14 | 0.15 | 0.14 | 0.15 | 0.14 | 0.13 | 0.15 | 0.14 |
| Contraction ratio through moisture effusion(%) | 0.12 | 0.17 | 0.16 | 0.14 | 0.14 | 0.15 | 0.15 | 0.14 | 0.14 | 0.14 |
| Microcracking test(cycle) | 7 | 6 | 6 | 7 | 7 | 7 | 7 | 6 | 7 | 8 |
| Freezing and fusion resistance(%) | 0.2 | 0.8 | 0.7 | 0.5 | 0.6 | 0.7 | 0.7 | 0.4 | 0.6 | 0.8 |
| Nail performance | ○ | ○ | ○ | ○ | ○ | ○ | ○ | ○ | ○ | ○ |

TABLE 5

| Raw material composition(% by mass) | Comparison1 | Comparison2 | Comparison3 | Comparison4 | Comparison5 | Comparison6 |
|---|---|---|---|---|---|---|
| Portland cement | 11 | 25 | 55 | 46 | 30 | 30 |
| Silica sand | 75 | 58 | 28 | 40 | 46 | 47 |
| Blast furnace slag | 0 | 0 | 0 | 0 | 0 | 0 |
| Fly ash | 0 | 0 | 0 | 0 | 0 | 0 |
| Finely dividing fly ash | 0 | 0 | 0 | 0 | 0 | 0 |
| Silica fume | 0 | 3 | 3 | 0 | 3 | 5 |
| Perlite powder | 0 | 0 | 0 | 0 | 0 | 0 |
| Glass powder | 0 | 0 | 0 | 0 | 0 | 0 |
| NUKP | 8 | 8 | 8 | 8 | 8 | 8 |
| NBKP | 0 | 0 | 0 | 0 | 0 | 0 |
| Used newspaper | 2 | 2 | 2 | 2 | 2 | 2 |
| Mica | 3 | 3 | 3 | 3 | 10 | 3 |
| Polyvinyl alcohol resin | 1 | 1 | 1 | 1 | 1 | 5 |

TABLE 6

| Physical property | Comparison1 | Comparison2 | Comparison3 | Comparison4 | Comparison5 | Comparison6 |
|---|---|---|---|---|---|---|
| Presence or absence of crystalline silica | present | present | present | present | present | present |
| Absolute dry specific gravity | 1.17 | 1.18 | 1.55 | 1.38 | 1.11 | 1.07 |
| Young's modulus(kN/mm$^2$) | 5.8 | 5.5 | 9.3 | 8.2 | 4.5 | 4.2 |
| Bending strength(N/mm$^2$) | 11.9 | 17.3 | 16.8 | 19.1 | 12.3 | 12.1 |
| Elongation ratio through water absorption(%) | 0.15 | 0.17 | 0.15 | 0.16 | 0.14 | 0.15 |
| Contraction ratio through moisture effusion(%) | 0.15 | 0.18 | 0.17 | 0.17 | 0.13 | 0.14 |
| Microcracking test(cycle) | 6 | 8 | 1 | 2 | 8 | 8 |
| Freezing and fusion resistance(%) | 6.3 | 2.6 | 0.3 | 0.5 | 5.5 | 4.1 |
| Nail performance | ○ | ○ | x | x | ○ | ○ |

What is claimed is:

1. A fiber reinforced cement composition comprising the following raw materials:

not less than 25% by mass and not more than 45% by mass of a hydraulic inorganic material;

not less than 50% by mass and not more than 65% by mass of a siliceous material;

not less than 5% by mass and not more than 12% by mass of woody reinforcement;

not less than 1% by mass and not more than 7% by mass of mica; and not less than 0.25% by mass and not more than 1.5% by mass of a water-soluble resin, wherein the hydraulic inorganic material is a Portland cement, the siliceous material is amorphous material, and is fly ash and/or silica fume and/or blast furnace slag and/or perlite powder and/or glass powder, the woody reinforcement is needle-leaves-tree unbleached kraft pulp and/or needle-leaves-tree bleached kraft pulp and used newspaper, and the water-soluble resin is a polyvinyl alcohol resin.

2. The fiber reinforced cement composition according to claim 1, wherein the fly ash contains not less than 50% by mass and not more than 70% by mass of SiO$_2$ component.

3. The fiber reinforced cement composition according to claim 1, wherein the silica fume contains not less than 97% by mass of SiO$_2$ component.

4. The fiber reinforced cement composition according to claim 1, wherein the blast furnace slag contains not less than 20% by mass and not more than 40% by mass of SiO$_2$ component.

5. The fiber reinforced cement composition according to claim 1, wherein the Portland cement has the following chemical composition:

SiO$_2$: not less than 18.0% by mass and not more than 23.0% by mass;

Al$_2$O$_3$: not less than 2.0% by mass and not more than 6.0% by mass;

Fe$_2$O$_3$: not less than 1.0% by mass and not more than 6.0% by mass;

CaO: not less than 60.0% by mass and not more than 65.0% by mass;

MgO: not more than 6.0% by mass;

SO$_3$: not more than 3.0% by mass;

Na$_2$O: not more than 0.3% by mass; and

K$_2$O: not more than 0.7% by mass.

6. The fiber reinforced cement composition according to claim 1, wherein the Portland cement has the following mineralogical compositions:

C$_3$S: not less than 60.0% by mass and not more than 65.0% by mass;

C$_2$S: not less than 9.0% by mass and not more than 13.0% by mass;

C$_3$A: not less than 5.0% by mass and not more than 9.0% by mass; and

C$_4$AF: not less than 6.0% by mass and not more than 10.0% by mass.

7. The fiber reinforced cement composition according to claim 1, wherein the needle-leaves-tree unbleached kraft pulp and/or the needle-leaves-tree bleached kraft pulp have a Canadian standard freeness of not more than 500 ml.

8. The fiber reinforced cement composition according to claim 1, wherein the used newspaper has a fiber length of not less than 0.5 mm and not more than 3.0 mm, a fiber diameter of not less than 10 μm and not more than 100 μm, and a Canadian standard freeness of not more than 350 ml.

9. The fiber reinforced cement composition according to claim 1, wherein the woody reinforcement is a mixture of two kinds of woody reinforcement.

10. The fiber reinforced cement composition according to claim 1, wherein the woody reinforcement is a mixture of the needle-leaves-tree unbleached kraft pulp and/or the needle-leaves-tree bleached kraft pulp and the used newspaper in a ratio of the needle-leaves-tree unbleached kraft pulp and/or the needle-leaves-tree bleached kraft pulp to the used paper in a range of from 1:1 to 4:1.

11. The fiber reinforced cement composition having the following raw material composition:

not less than 28% by mass and not more than 32% by mass of Portland cement as hydraulic inorganic material;

not less than 54% by mass and not more than 58% by mass in total of fly ash and silica fume as an amorphous siliceous material;

not less than 2% by mass and not more than 5% by mass of mica; and not less than 0.5% by mass and not more than 1.25% by mass of a water-soluble resin, wherein the amount of the silica fume is not less than 3% by mass and not more than 7% by mass of the whole amorphous siliceous material consisting of the fly ash and the silica fume, not less than 8% by mass and not more than 12% by mass in total of needle-leaves-tree unbleached kraft pulp and/or needle-leaves-tree bleached kraft pulp and used newspaper as a woody reinforcement, wherein the amount of the used newspaper is not less than 20% by mass and not more than 50% by mass of the whole woody reinforcement consisting of the needle-leaves-tree unbleached kraft pulp and/or the needle-leaves-tree bleached kraft pulp and the used newspaper, the fly ash contains 50-70% by mass of $SiO_2$, the silica fume contains 97% by mass or more of and the water-soluble resin is a polyvinyl alcohol resin.

12. The fiber reinforced cement composition having the following raw material composition:

not less than 28% by mass and not more than 32% by mass of Portland cement as hydraulic inorganic material;

not less than 54% by mass and not more than 58% by mass in total of blast furnace slag and silica fume as an amorphous siliceous material;

not less than 2% by mass and not more than 5% by mass of mica; and not less than 0.5% by mass and not more than 1.25% by mass of a water-soluble resin, wherein the amount of the silica fume is not less than 5% by mass and not more than 20% by mass of the whole amorphous siliceous material consisting of the blast furnace slag and the silica fume, not less than 8% by mass and not more than 12% by mass in total of needle-leaves-tree unbleached kraft pulp and/or needle-leaves-tree bleached kraft pulp and used newspaper as a woody reinforcement, wherein the amount of the used newspaper is not less than 20% by mass and not more than 50% by mass of the whole woody reinforcement consisting of the needle-leaves-tree unbleached kraft pulp and/or the needle-leaves-tree bleached kraft pulp and the used newspaper, the blast furnace slag contains 20-40% by mass of $SiO_2$, the silica fume contains 97% by mass or more of $SiO_2$, and the water-soluble resin is a polyvinyl alcohol resin.

13. The fiber reinforced cement composition having the following raw material composition:

not less than 28% by mass and not more than 32% by mass of Portland cement as hydraulic inorganic material;

not less than 54% by mass and not more than 58% by mass in total of blast furnace slag and fly ash as an amorphous siliceous material;

not less than 2% by mass and not more than 5% by mass of mica; and not less than 0.5% by mass and not more than 1.25% by mass of a water-soluble resin, wherein the amount of the fly ash is not less than 30% by mass and not more than 70% by mass of the whole amorphous siliceous material consisting of the blast furnace slag and the fly ash, not less than 8% by mass and not more than 12% by mass in total of needle-leaves-tree unbleached kraft pulp and/or needle-leaves-tree bleached kraft pulp and used newspaper as a woody reinforcement, wherein the amount of the used newspaper is not less than 20% by mass and not more than 50% by mass of the whole woody reinforcement consisting of the needle-leaves-tree unbleached kraft pulp and/or the needle-leaves-tree bleached kraft pulp and the used newspaper, the fly ash contains 50-70% by mass of $SiO_2$, the blast furnace slag contains 20-40% by mass of $SiO_2$, and the water-soluble resin is a polyvinyl alcohol resin.

14. The fiber reinforced cement product manufactured from the fiber reinforced cement composition according to claim 11.

15. A fiber reinforced cement product having the following physical property conditions: the product substantially does not have the peak manifestation of quartz, cristobalite and tridymite in X-ray diffraction.

16. The fiber reinforced cement product according to claim 15, having the following raw material composition:

not less than 28% by mass and not more than 32% by mass of Portland cement as hydraulic inorganic material;

not less than 54% by mass and not more than 58% by mass in total of fly ash and silica fume as an amorphous siliceous material;

not less than 2% by mass and not more than 5% by mass of mica; and not less than 0.5% by mass and not more than 1.25% by mass of a water-soluble resin, wherein the amount of the silica fume is not less than 3% by mass and not more than 7% by mass of the whole amorphous siliceous material consisting of the fly ash and the silica fume, not less than 8% by mass and not more than 12% by mass in total of needle-leaves-tree unbleached kraft pulp and/or needle-leaves-tree bleached kraft pulp and used newspaper as a woody reinforcement, wherein the amount of the used paper is not less than 20% by mass and not more than 50% by mass of the whole woody reinforcement consisting of the needle-leaves-tree unbleached kraft pulp and/or the needle-leaves-tree bleached kraft pulp and the used newspaper, the fly ash comprises 50-70% by mass of $SiO_2$, the silica fume comprises 97% by mass or more of $SiO_2$ and the water-soluble resin is a polyvinyl alcohol resin.

17. The fiber reinforced cement product according to claim 15, having the following raw material composition:

not less than 28% by mass and not more than 32% by mass of Portland cement as hydraulic inorganic material;

not less than 54% by mass and not more than 58% by mass in total of blast furnace slag and silica fume as an amorphous siliceous material;

not less than 2% by mass and not more than 5% by mass of mica; and not less than 0.5% by mass and not more than 1.25% by mass of a water-soluble resin, wherein the amount of the silica fume is not less than 5% by mass and not more than 20% by mass of the whole amorphous siliceous material consisting of the blast furnace slag and the silica fume, not less than 8% by mass and not more than 12% by mass in total of needle-leaves-tree unbleached kraft pulp and/or needle-leaves-tree bleached kraft pulp and used newspaper as a woody reinforcement, wherein the amount of the used newspaper is not less than 20% by mass and not more than 50% by mass of the whole woody reinforcement consisting of the needle-leaves-tree unbleached kraft pulp and/or the needle-leaves-tree bleached kraft pulp and the used newspaper, the blast furnace slag comprises 20-40% by mass of $SiO_2$, the silica fume comprises 97% by mass or more of $SiO_2$, and the water-soluble resin is a polyvinyl alcohol resin.

18. The fiber reinforced cement product according to claim 15, having the following raw material composition:

not less than 28% by mass and not more than 32% by mass of Portland cement as hydraulic inorganic material;

not less than 54% by mass and not more than 58% by mass in total of blast furnace slag and fly ash as an amorphous siliceous material;

not less than 2% by mass and not more than 5% by mass of mica; and not less than 0.5% by mass and not more than 1.25% by mass of a water-soluble resin, wherein the amount of the fly ash is not less than 30% by mass and not more than 70% by mass of the whole amorphous siliceous material consisting of the blast furnace slag and the fly ash, not less than 8% by mass and not more than 12% by mass in total of needle-leaves-tree unbleached kraft pulp and/or needle-leaves-tree bleached kraft pulp and used newspaper as a woody reinforcement, wherein the amount of the used paper is not less than 20% by mass and not more than 50% by mass of the whole woody reinforcement consisting of the needle-leaves-tree unbleached kraft pulp and/or the needle-leaves-tree bleached kraft pulp and the used newspaper, the fly ash comprises 50-70% by mass of $SiO_2$, the blast furnace slag comprises 20-40% by mass of $SiO_2$, and the water-soluble resin is a polyvinyl alcohol resin.

19. A process for manufacturing a fiber reinforced cement product comprising the steps of:

dispersing in water a raw material composition to give a slurry of the raw materials;

forming a green mat by forming the slurry; and pressing the green mat by press molding and thereafter curing the mat in an autoclave at a temperature not lower than 150° C., wherein the raw material composition comprises:

not less than 25% by mass and not more than 45% by mass of a hydraulic inorganic material;

not less than 50% by mass and not more than 65% by mass of a siliceous material;

not less than 5% by mass and not more than 12% by mass of woody reinforcement;

not less than 1% by mass and not more than 7% by mass of mica; and not less than 0.25% by mass and not more than 1.5% by mass of a water-soluble resin, wherein the hydraulic inorganic material is a Portland cement, the siliceous material is amorphous material, and is fly ash and/or silica fume and/or blast furnace slag and/or perlite powder and/or glass powder, the woody reinforcement is needle-leaves-tree unbleached kraft pulp and/or needle-leaves-tree bleached kraft pulp and used newspaper, and the water-soluble resin is a polyvinyl alcohol resin.

20. A process for manufacturing a fiber reinforced cement product comprising the steps of:

dispersing in water a raw material composition to give a slurry of the raw materials;

forming a green mat by forming the slurry; and pressing the green mat by press molding and thereafter curing the mat in an autoclave at a temperature not lower than 150° C., wherein the raw material composition comprises:

not less than 28% by mass and not more than 32% by mass of Portland cement as hydraulic inorganic material;

not less than 54% by mass and not more than 58% by mass in total of fly ash, and silica fume as an amorphous siliceous material;

not less than 2% by mass and not more than 5% by mass of mica; and not less than 0.5% by mass and not more than 1.25% by mass of a water-soluble resin, wherein the amount of the silica fume is not less than 3% by mass and not more than 7% by mass of the whole amorphous siliceous material consisting of the fly ash and the silica fume, not less than 8% by mass and not more than 12% by mass in total of needle-leaves-tree unbleached kraft pulp and/or needle-leaves-tree bleached kraft pulp and used newspaper as a woody reinforcement, wherein the amount of the used newspaper is not less than 20% by mass and not more than 50% by mass of the whole woody reinforcement consisting of the needle-leaves-tree unbleached kraft pulp and/or the needle-leaves-tree bleached kraft pulp and the used newspaper, the fly ash contains 50-70% by mass of $SiO_2$, the silica fume contains 97% by mass or more of $SiO_2$, and the water-soluble resin is a polyvinyl alcohol resin.

21. A process for manufacturing a fiber reinforced cement product comprising the steps of:

dispersing in water a raw material composition to give a slurry of the raw materials;

forming a green mat by forming the slurry; and pressing the green mat by press molding and thereafter curing the mat in an autoclave at a temperature not lower than 150° C., wherein the raw material composition comprises:

not less than 28% by mass and not more than 32% by mass of Portland cement as hydraulic inorganic material;

not less than 54% by mass and not more than 58% by mass in total of blast furnace slag and silica fume as an amorphous siliceous material;

not less than 2% by mass and not more than 5% by mass of mica; and not less than 0.5% by mass and not more than 1.25% by mass of a water-soluble resin, wherein the amount of the silica fume is not less than 5% by mass and not more than 20% by mass of the whole amorphous siliceous material consisting of the blast furnace slag and the silica fume, not less than 8% by mass and not more than 12% by mass in total of needle-leaves-tree unbleached kraft pulp and/or needle-leaves-tree bleached kraft pulp and used newspaper as a woody reinforcement, wherein the amount of the used newspaper is not less than 20% by mass and not more than 50% by mass of the whole woody reinforcement consisting of the needle-leaves-tree unbleached kraft pulp and/or the needle-leaves-tree bleached kraft pulp and the used newspaper, the blast furnace slag contains 20-40% by mass of $SiO_2$, the silica fume contains 97% by mass or more of $SiO_2$, and the water-soluble resin is a polyvinyl alcohol resin.

22. A process for manufacturing a fiber reinforced cement product comprising the steps of:

dispersing in water a raw material composition to give a slurry of the raw materials;

forming a green mat by forming the slurry; and pressing the green mat by press molding and thereafter curing the mat in an autoclave at a temperature not lower than 150° C., wherein the raw material composition comprises:

not less than 28% by mass and not more than 32% by mass of Portland cement as hydraulic inorganic material;

not less than 54% by mass and not more than 58% by mass in total of blast furnace slag and fly ash as an amorphous siliceous material;

not less than 2% by mass and not more than 5% by mass of mica; and not less than 0.5% by mass and not more than 1.25% by mass of a water-soluble resin, wherein the amount of the fly ash is not less than 30% by mass and not more than 70% by mass of the whole amorphous siliceous material consisting of the blast furnace slag and the fly ash, not less than 8% by mass and not more than 12% by mass in total of needle-leaves-tree unbleached kraft pulp and/or needle-leaves-tree bleached kraft pulp and used newspaper as a woody reinforcement, wherein the amount of the used newspaper is not less than 20% by mass and not more than 50% by mass of the whole woody reinforcement consisting of the needle-leaves-tree unbleached kraft pulp and/or the needle-leaves-tree bleached kraft pulp and the used newspaper, the fly ash contains 50-70% by mass of $SiO_2$, the blast furnace slag contains 20-40% by mass of $SiO_2$, and the water-soluble resin is a polyvinyl alcohol resin.

23. The fiber reinforced cement product manufactured from the fiber reinforced cement composition according to claim 12.

24. The fiber reinforced cement product manufactured from the fiber reinforced cement composition according to claim 13.

25. The fiber reinforced cement composition according to claim 1, wherein the siliceous material comprises at least two materials selected from the group consisting of fly ash, silica fume, blast furnace slag, perlite powder and glass powder.

* * * * *